United States Patent [19]
Thurber et al.

[11] Patent Number: 5,426,130
[45] Date of Patent: Jun. 20, 1995

[54] ADHESIVE SYSTEM

[75] Inventors: Mark C. Thurber, Rochester Hills; Richard B. Wallace, Bloomfield, both of Mich.

[73] Assignee: ND Industries, Inc., Troy, Mich.

[21] Appl. No.: 103,157

[22] Filed: Aug. 9, 1993

Related U.S. Application Data

[63] Continuation of Ser. No. 655,854, Feb. 15, 1991, abandoned.

[51] Int. Cl.⁶ .............................................. C08F 2/46
[52] U.S. Cl. .................................. 522/14; 522/170; 411/82
[58] Field of Search ..................... 522/14, 170; 411/82

[56] References Cited

U.S. PATENT DOCUMENTS

| | | | |
|---|---|---|---|
| Re. 28,812 | 5/1976 | Duffy | 470/10 |
| Re. 34,522 | 1/1994 | Wallace | 427/510 |
| 3,243,211 | 3/1966 | Wetmore | 287/78 |
| 3,360,631 | 12/1967 | Hess | 219/85 |
| 3,642,937 | 2/1972 | Deckert et al. | 260/834 |
| 3,704,264 | 11/1972 | Gorman | 252/316 |
| 3,721,749 | 3/1973 | Clabburn | 174/88 R |
| 3,746,068 | 7/1973 | Deckert et al. | 411/258 |
| 3,787,222 | 1/1974 | Duffy | 427/195 |
| 3,852,517 | 12/1974 | Del Fava | 174/84 R |
| 3,930,606 | 1/1976 | Dewdney | 228/232 |
| 3,944,721 | 3/1976 | Reeder | 174/88 R |
| 3,945,114 | 3/1976 | Siden et al. | 29/859 |
| 4,070,398 | 1/1978 | Lu | 206/524.2 |
| 4,091,122 | 5/1978 | Davis et al. | 427/500 |
| 4,228,216 | 10/1980 | Austin et al. | 503/215 |
| 4,285,378 | 8/1981 | Wallace | 411/258 |
| 4,325,985 | 4/1982 | Wallace | 427/985 |
| 4,366,190 | 12/1982 | Rodden et al. | 427/183 |
| 4,479,990 | 10/1984 | Dixon | 522/170 |
| 4,484,204 | 11/1984 | Yamamoto et al. | 503/200 |
| 4,536,524 | 8/1985 | Hart et al. | 523/176 |
| 4,552,604 | 11/1985 | Green | 522/170 |
| 4,553,809 | 11/1985 | Holt | 439/874 |
| 4,588,639 | 5/1986 | Ozono | 428/402.22 |
| 4,632,944 | 12/1986 | Thompson | 522/11 |
| 4,686,272 | 8/1987 | Wallace | 528/87 |
| 4,764,579 | 8/1988 | Wallace | 528/87 |
| 4,778,948 | 10/1988 | Fitch et al. | 174/88 R |
| 4,847,113 | 7/1989 | Wallace | 427/54.1 |
| 4,892,764 | 1/1990 | Drain | 428/34.5 |
| 4,952,342 | 8/1990 | Drain | 264/22 |
| 5,000,636 | 3/1991 | Wallace | 411/258 |

*Primary Examiner*—Mark A. Chapman
*Attorney, Agent, or Firm*—Thomas P. Liniak

[57] ABSTRACT

An adhesive system capable of use to secure two substrates to one another. The adhesive system uses a resin and a hardener which are encased in a polymerized, integral film.

25 Claims, 2 Drawing Sheets

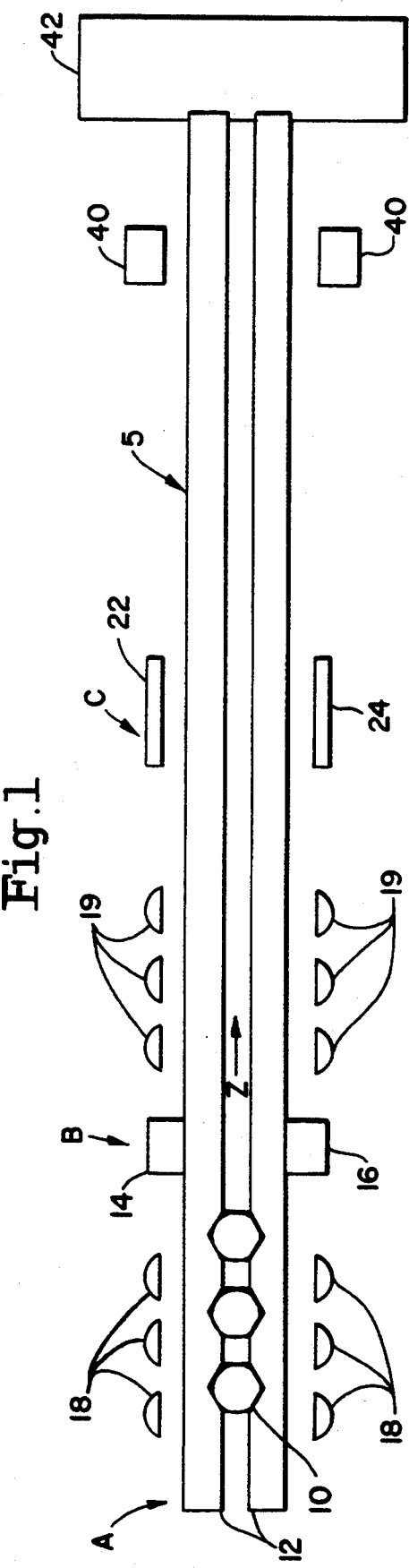
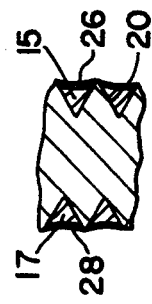
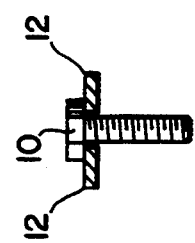
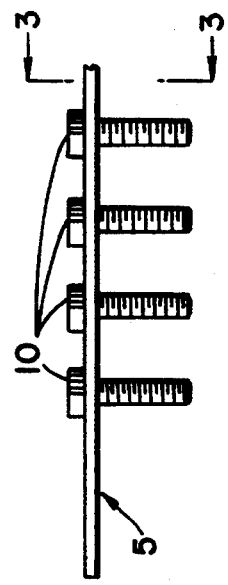

ADHESIVE SYSTEM

This is a continuation of application Ser. No. 07/655,854, filed on Feb. 15, 1991 now abandoned.

FIELD OF THE INVENTION

The present invention relates to an adhesive system capable of forming a locking seal between two substrates. In particular, the invention relates to the use of the adhesive system to produce self-locking fasteners or to fasten surfaces together. The invention also pertains to methods for preparing the adhesive system, and to an apparatus for preparing such fasteners.

BACKGROUND OF THE INVENTION

Several methods and fastening devices have, in the past, been used to lock or seal two substrates to one another in order that they will resist mechanical separation, or form a liquid or airtight seal to prevent the flow or escape of fluids.

In particular, fastening devices have been proposed, or used, which employed adhesives or plastics in one way or another in order to prevent the fasteners from loosening during use or service. Early locking compositions were applied in liquid form shortly before assembly of the inter-fitting parts. However, in order to facilitate the high rates of assembly of the mass-production engineering industries such as the automotive industry, pre-applied coatings are preferred.

One prior method involved the use of a nylon plastic "patch," such as those described by Villo (U.S. Pat. No. 3,093,177). Such patches were applied to a metal member by a process in which a nylon pellet was mechanically applied through the application of heat (as for example, 450° F.) and pressure (as for example, 100 PSI), and thereby fused to the metal surface. As will be perceived, this method required high temperatures and pressure, and thus was not suitable for many applications. Several later alternatives to the use of a nylon pellet have been developed, such as the creation of the patch by spraying powdered nylon and a primer epoxy resin (pre-applied or mixed as a powder with the nylon powder) onto the fastener preheated to a temperature sufficient to melt the powder (e.g. U.S. Pat. Nos. Re 28,812 and 3,787,222).

An alternative adhesive system was developed by Wallace (U.S. Pat. No. 4,285,378). The Wallace method employed a resin powder (preferably nylon and/or teflon) and an activator capable of reacting to polymerize the resin into an essentially solid, non-tacky resilient deposit. The Wallace method had the advantage that the material could be applied to the metal surface cold and, thus, that it was not necessary to use temperatures approaching the melting or fusing temperature of nylon. Nevertheless, the physical properties of the epoxy-nylon mixture were sufficiently close to those of aforesaid nylon patch methods so that the friction locking effect was substantially identical to that of a solid nylon patch.

Further alternatives to the nylon patch technology generally fall into three distinct categories: systems using microencapsulated components, systems using non-integral films, and systems using integral films. Adhesive systems which use microencapsulated components may employ either integral or non-integral films. Typically, the improved adhesive systems have employed an epoxy resin and a polymerizing (or "hardening") agent.

Such methods most preferably may be adapted to permit the continuous manufacture of self-locking articles. Rodden et al. (U.S. Pat. No. 4,366,190), for example, describes an apparatus which provides a feeder means to supply threaded articles in substantially continuous succession and a support for conveying such articles along the path for heating the articles and then for applying a heat fusible resin to the articles.

A. Adhesive Systems Which Employ Microencapsulated Components

Adhesive systems have been described which employ microencapsulated components (such as a resin and its curing agent). In such formulations, the encapsulated resin and curing agent do not react until the capsules are broken and the resin and curing agent are able to contact one another. Microencapsulated systems may, depending upon formulation, be advantageous in extending shelf- or pot-life, and in having more desirable break away torques, consistency and reproducibility.

In adhesive systems which employ microcapsules, the resin or hardener is typically mixed with a polymerizing agent, and applied to the metal substrate as a slurry, etc. Methods for microencapsulation are described in U.S. Pat. No. 3,746,068.

Further methods of encapsulation are described by Gorman in U.S. Pat. No. 3,704,264. This patent describes the encapsulation of a homopolymeric composition comprising a core of a liquid monomeric, polymerizable, acrylate ester. The patent teaches that dimethacrylates are suitable for use as the monomeric acrylate esters of the invention. Encapsulation products are prepared by introducing discrete portions of the monomeric compositions into a fluid and then contacting the portions with a polymerization catalyst capable of promoting homopolymerization of the monomeric composition. The portions are removed from the fluid after an encapsulating shell of homopolymer has been formed. The film is formed in situ by encapsulating the monomeric compositions in a shell of the homopolymer. Thus, the Gorman et al. method creates an integral film (i.e. a film whose composition is substantially identical to the composition of the resin or the hardener composition which it covers).

One disadvantage of the Gorman et al. method is that control of particle size and wall thickness (particularly of small microcapsules) is difficult. A second disadvantage of the method is the use of water as a solvent which must be removed (by drying) after formation of the microcapsules. The removal of the aqueous solvent is time consuming and energy inefficient.

A second integral film microencapsulation method is disclosed by Ozono (U.S. Pat. No. 4,588,639). The patent describes microcapsules which contain a hydrophobic acrylate or methacrylate monomer or oligomer capable of polymerization upon exposure to ultra-violet light, a photosensitizer, and a UV screening agent. The microcapsules are dispersed in water to form a colloidal dispersion and exposed to UV light with a fluence sufficient to cure only the surface of the microcapsule. The resulting microcapsules have a core of the microcapsule. acrylate or methacrylate monomer or oligomer encapsulated within a shell of the cured acrylate or methacrylate. Thus, use of the method results in the formation of an integral film. The patent discloses the use of 1,6-hexanediol diacrylate and dimethacrylate as suitable monomers. In order to control the wall thickness, the method requires the use of an ultraviolet screening agent in the compositions.

In contrast, Austin et al. (U.S. Pat. No. 4,228,216) disclose a microcapsule having a hydrophobic, radiation curable, liquid core encased in a non-integral film (i.e. a film whose composition differs from that of the material which it covers). The microcapsules are produced by incorporating a "wall forming" component into the hydrophobic liquid, and forming droplets of this liquid in a hydrophilic emulsion which contains a second "wall forming" component. Reaction between these two "wall forming" components results in the formation of a non-integral skin. The microcapsules can then be cured using radiation, to produce the desired coating.

Hart (U.S. Pat. No. 4,536,524) describes a microencapsulated epoxy adhesive system employing a coacervate emulsion containing a hydrophobic curing agent and a microencapsulated epoxy resin. The disclosed microcapsules have a non-integral skin composed of an agent such as a polyvinyl alcohol.

Deckert et al. (U.S. Pat. Nos. 3,642,937 and 3,746,068) disclose a stable, pressure-activatable adhesive system which employs a microencapsulated resin (preferably an epoxy and a non-volatile curative therefore). The resin is encapsulated in a shell of a urea-formaldehyde resin. Thus, the patent discloses the formation of a capsule having a non-integral film. The microcapsules are mixed with a binder matrix which contains a curing agent for the encapsulated resin. This composition may be applied to a surface (such as a bolt, etc.), or may be used as a sheet or on a washer. Upon application of a shearing force to the surface, the capsules are ruptured and the resin thereby comes in contact with the curing agent. The composition additionally contains a binder resin added to provide a formulation which will dry to form a solid, substantially tack-free state.

B. Adhesive Systems Which Employ Non-Integral Films

In systems employing a non-integral film, a thin film is formed on the surface of a pre-deposited epoxy resin or hardening agent by the application of a film forming agent to the surface of the composition containing the resin or the hardening agent. This system thus requires a first coating containing the resin or polymerizing agent, followed by a second coating which contains the film-forming agent. Such a system produces a non-integral film.

Davis et al. (U.S. Pat. No. 4,091,122), for example, describe a process for producing a film over a liquid material using a radiation-curable coating. Although the patent is directed to the use of such coatings to produce "carbonless" paper, it provides a detailed discussion of the use of radiation-curable coatings. Such coatings may be used to form non-integral films over epoxy resins or polymerizing agents. The use of 1,6 hexanediol diacrylate as a radiation curable substance is disclosed.

Lu (U.S. Pat. No. 4,070,398) describes laminates which are produced by coating a metal foil with a radiation-curable composition, in order to form an outer membrane layer.

Yamamoto et al. (U.S. Pat. No. 4,484,204) describes a heat sensitive record material comprising a base sheet and a heat-sensitive record layer formed over the base sheet. A resin layer, cured with an electron beam, is formed over the record layer. A large number of unsaturated polyesters, polyester acrylates or polyester methacrylates, urethane acrylates or urethane methacrylates, epoxy acrylates or epoxy methacrylates, silicone acrylates or silicone methacrylates, polybutadiene acrylates or polybutadiene methacrylates, polyether acrylates or polyether methacrylates, or melamine acrylates or melamine methacrylates may be employed. The patent, in particular, discloses the use of 1,6 hexanediol diacrylate as a useful acrylate monomer in forming the resin layer.

A significant improvement in this art was described by R. B. Wallace in U.S. Pat. No. 4,325,985. This improvement relates primarily to a substantial elimination of the drying time that had been previously required to protect fluid deposits on a thread area of a threaded fastening device. In a preferred embodiment of the invention, adjacent fluid deposits of a two-part adhesive, such as an uncured epoxy resin and a polymerizing agent therefore were permanently protected by a thin, dry, solid, non-tacky, non-integral cover film which was applied immediately after the still-fluid deposit of the resin and polymerizing agent.

The cover film is formed by irradiating a UV-curable film forming material with ultra-violet light. The improved method permitted the use of much lower temperatures than had been possible with earlier methods.

Further improvements in non-integral film adhesive systems were disclosed by R. B. Wallace in U.S. Pat. Nos. 4,686,272 and 4,764,579. The Wallace U.S. Pat. No. 4,764,579 patent describes a method for producing a fluid, self-curing or setable adhesive for general application. The adhesive system comprises a mixture of a multiplicity of small, discrete, contiguous deposits of a first fluid containing an uncured but curable fluid resin, and a second fluid comprising a fluid of curing agent for the particular resin. The contiguous deposits were separated by a thin, flexible, and rupturable protective film barrier formed in situ by reaction of the fluid resin and the fluid curing agent. Since the film barrier differs in composition from either the fluid resin, or the curing agent, the method exemplifies a non-integral film adhesive system.

In order to effect adhesion, the adhesive system described in the Wallace U.S. Pat. No. 4,764,579 patent must be kneaded or mixed under force sufficient to rupture the barrier film. A divisional of the U.S. Pat. No. 4,764,579 patent (Wallace, U.S. Pat. No. 4,686,272) is directed to the fluid adhesive mixture, per se.

Significantly, the Wallace U.S. Pat. No. 4,764,579 method permitted one to limit the thickness of the barrier film that was formed by the reaction between the resin and the activator or curing agent. The method permitted one to form very thin barrier membranes.

The Wallace U.S. Pat. No. 4,764,579 patent discloses the use of the compositions in enclosures such as the recess in a wire nut (Stockwell, U.S. Pat. No. 2,825,750).

The formulations of the present invention may be used in the conventional wire nut of Stockwell, or in another, alternative wire nut design: i.e. a "butt connector" capable of joining two wires, end-to-end. Typically, such a "butt-connector" will comprise an inner crimpable metal tube covered by a semi-rigid vinyl sleeve. The wires which are to be joined are typically inserted into each end, and the tube is crimped closed through the flexible sleeve with, for example, a crimping tool or pliers, thus locking the wires in place. Examples of "butt-connectors" are disclosed by Wetmore (U.S. Pat. No. 3,243,211), Reeder (U.S. Pat. No. 3,944,721), Fava (U.S. Pat. No. 3,852,517), Holt (U.S.

Pat. No. 4,553,809), and, in particular, Fitch et al. (U.S. Pat. No. 4,778,984), Clabburn (U.S. Pat. No. 3,721,749), Hess (U.S. Pat. No. 3,360,631), Siden et al. (U.S. Pat. No. 3,945,114), and Dewdney (U.S. Pat. No. 3,930,606).

Use of the present invention provides a means for protecting both the conventional Stockwell wirenut, and for a novel "butt-connector" described below from corrosive elements. In the novel "butt-connector" of the present invention, the vinyl sleeve is eliminated, and the wires are crimped in the bare metal tube. Around the crimped metal tube is placed a coffin-like case (preferably nylon), having a cover hinged to a receptacle for the metal tube, and possessing a suitable hole at each axial end for the wires extending from the crimped tube. Most preferably, the case would lock on closing, through the presence and action of a barbed ridge at the closing edges of the receptacle and the cover. The center area of the case is enlarged, and contains the photo-skinned resin and hardener compositions of the present invention. Desirably, the skins of the compositions would immediately rupture and be extruded axially as the hinged cover is closed onto the receptacle. Preferably, the case would then be rotated along the axis of the metal tube/wires, in order to further mix the compositions, and to enhance their distribution around the exposed areas at the ends of the metal tube.

C. Adhesive Systems Which Employ Integral Films

Although the above-described non-integral film adhesive systems have a number of advantages over liquid products in ease and speed of assembly, they have a number of shortcomings: the binder used is frequently not an integral part of the final polymerized film and the resulting strength is therefore not as great as that of a film from the monomer alone, such as is obtained from a polymerizable liquid product. Non-integral films cause the friction of assembly to be increased, thus adversely affecting the torques/tension relationship so that the tension achievable in a fastener for a given torque is less than that achievable for an uncoated fastener. Stripping of the film can occur, particularly on some surfaces with ill fitting or burred nuts with consequent failure of the locking system. The coating is either deposited from organic solvent which is expensive and wasteful in operation and is normally a health and safety hazard, or is deposited from aqueous emulsion, but in this event ovens for drying are necessary which are expensive in capital requirements and in energy of operation.

In systems which employ integral films, the film is an integral part of the composition, and is in intimate association with the epoxy resin or hardening agent of the adhesive (or lock-forming material). The material is treated to form a thin film on the surface of the epoxy or polymerizing agent deposit. Typically, in such systems, an opacifier agent is added to the compositions in order to control film thickness.

Thompson (U.S. Pat. No. 4,632,944), for example, describes a polymerizable fluid for sealing and locking engineering parts. Sealing is mediated after a coating of the fluid is applied to an engineering part. Sealing is achieved by free-radical initiated polymerization of the same monomer that ultimately comprises the final cured film, and results in the formation of an integral film. This first film forming step (free radical initiated polymerization) is initiated by radiation (such as by UV light). An opacifier (such as a powder dispersed in the fluid) must be added to the polymerizing composition to limit the depth of polymerization to the formation of a film only. The polymerization reaction creates a dry, tack-free skin, but due to the presence of the opacifier, radiation is obstructed from passing beyond the surface layer. Thus, fluid below the surface layer is unaffected by the radiation.

A second curing of the remaining liquid monomer below the skin is accomplished through the use of a free radical induced addition polymerization. Polymerization is initiated when two engineering parts are assembled together.

The adhesive system disclosed by Thompson contains five essential elements. The polymerizable monomer is an acrylic or methacrylic ester. The use of acrylate or methacrylate esters of a monohydric, dihydric, trihydric or polyhydric alcohol, such as n-hexanol, ethoxylated bisphenol A, trimethylol propane, or pentaerythritol, is explicitly taught. The second component of the system is a photoinitiator which is a free radical polymerization catalyst such as a benzoyl peroxide. The third element of the system is an activator which is a tertiary amine such as a substituted aniline or a heavy metal such as copper, lead etc. The fourth component of the system is a photoinitiator which absorbs energy at a certain wave length and leads to the cross-linking of the polymerizable monomer. The use of benzoin ethers, benzil, and similar agents are disclosed. The fifth element of the composition is the opacifier which is a finely divided powder opaque to incident radiation. The use of a pigment or extender or a metal powder is explicitly taught.

A further improvement in adhesive systems was developed by R. B. Wallace and is disclosed in U.S. Pat. No. 4,847,113. Whereas, as described above, prior methods had employed a subsequent UV curable coating material to encase the resin and its curing agent on a substrate, the method of the Wallace U.S. Pat. No. 4,847,113 patent provided a means for mixing the resin or curing agent with a UV curable material and then accomplishing the application of the material to the substrate in a single, rather than double application. In one embodiment, two fluid applicators apply two different liquids, each to different locations on the fastener. Each has in it a UV curable material. One has a curable resin in it, while the other has a hardener for the resin. The curable resin is not polymerizable by UV light; only the UV curable material is. In a typical apparatus, the fastener now having the two separated liquid patches on it, is moved to a second station where the deposited material is subjected to irradiation with ultraviolet light. This ultra-violet irradiation cures the UV curable material resulting in the formation of a flexible, dry, non-tacky and continuous, integral film or skin over the two deposits of curable resin and hardener, respectively. No opacifier is necessary in such a system since the depth of UV cure is adequately controlled by adjustment of the parameters of operation. Microencapsulation of the hardener within the liquid resin is also taught, such that only one patch need be applied, if desired. In either instance, fastening the fastener (nut to bolt) breaks the skin and mixes the hardener with the curable resin, thus effecting its cure.

The Wallace U.S. Pat. No. 4,847,113 patent discloses that a variety of UV curable monomers may be employed, but that a particularly good monomer for the purposes of that invention was trimethylopropane triacrylate (TMPTA). Any of a variety of photoinitiators (including ketones, benzophenones, aromatic ketones, and the like) may be employed. The curable, non-UV sensitive resin is preferably a commercially available epoxy (such as a bisphenol A epichlorohydrin resin). The Wallace U.S. Pat. No. 4,847,113 patent discloses the use of tertiary amines as effective curing agents for the epoxy resin. It has been found, however, that while an excellent product is formed using TMPTA, the shelf life of the applied hardener patch was somewhat limited, in that after a certain period (approximately six weeks) the hardener patch would become waxy and dry, even though the separate epoxy patch beneath the surface of the skin remained liquid. In an attempt to lengthen the shelf life, numerous hardeners were attempted, as listed below, but to no avail:

becoming tacky to the touch. The adhesive system should be deposited on the fastener as a dry-to-touch coating in which polymerizable fluids are incorporated and so that the action of assembly causes the components to mix with one another thereby causing polymerization of the fluids and locking and sealing of the assembly. The adhesive applied to the fastener should have long term stability after application and film formation (i.e. a long "shelf-life") so that the coated fastener may be handled and stored in accordance with conventional procedures without degrading the adhesive until used. In use, the fastening device should be capable of being readily applied without undue increase

| PRODUCT NAME | CHEMICAL SUPPLIER |
|---|---|
| NC-540 | CARDOLITE CO. |
| NC-541 | CARDOLITE CO. |
| CAPCURE 40 | HENKEL PROCESS CHEM. CO. |
| ACTIRON NX-3 | SYNTHRON INC. |
| HARDENER XU-HY-195 | CIBA GEIGY |
| BORON TRIFLUORIDE DIHYDRATE | CIBA GEIGY |
| PRIMER HP12 | HERON MFG INC. |
| NADIC | BUFFALO COLOR CORP. |
| CAPCURE 40 | HENKEL |
| CAPCURE 1.5 HV | HENKEL |
| HARDENER HY9225 | CIBA GEIGY |
| NC 513 | CARDOLITE CO. |
| ACRYLIC STRUCTURAL ADHESIVE | VERSICOK |
| ANCAMINE K-54 | PACIFIC ANCHOR CHEM. CORP. |
| NC 514 | CARDOLITE CO. |
| EPON CURING AGENT H-1 | SHELL CHEN. CORP. |
| HARDENER HT 939 | CIBA GEIGY |
| ANCAMINE K-618 EPOXY HARD. | PACIFIC ANCHOR CHEM. CORP. |
| ACTIRON NX-3 POWDER | SYNTHRON INC. |
| ACCELERATOR DY 064 | CIBA GEIGY |
| ACCELERATOR 225-B | LORD CORP. |
| FURSOR EPOXY ADHESIVE CURING AGENT 322 | LORD CORP. |
| VERSALOC 2258 | LORD CORP. |
| AZAMINE 1229 | SHEREX POLYMERS |
| ANCHOR K-54 | PACIFIC ANCHOR |
| HARDENER HY850 | CIBA GEIGY |
| NC-1307 | CARDOLITE |
| HARDENER NY 837 | CIBA GEIGY |
| HARDENER XU-HY-350 | CIBA GEIGY |
| N-(ISOBUTOXYMETHYL) ACRYLAMIDE | AMERICAN CYANAMID CO. |
| ANCHOR 1173 | PACIFIC ANCHOR |
| EPON CURING AGENT V-15 | SHELL CHEM. CO. |
| HARDENER HT 939 | CIBA GEIGY |
| EPON CURING AGENT U | SHELL CHEM. CO. |
| ANCHOR 1170 | PACIFIC ANCHOR |
| ACTIRON NXJ-60 | SYNTHRON INCORP. |
| ANCHOR 2044 | PACIFIC ANCHOR |
| ANCAMINE XT | PACIFIC ANCHOR |
| ANCAMINE AD | PACIFIC ANCHOR |
| VERSAMIDE 280875 | HENKEL |
| ANCAMINE 1769 | PACIFIC ANCHOR |
| ANCAMINE 1110 | PACIFIC ANCHOR |
| 1,3-DI-4-PYRIDYLPROPANE | NA |
| 2 ETHYL-4-METHYLIMIDAZOLE | NA |
| 4-METHYLIMIDAZOLE | NA |
| 1,2-DIMETHYLIMIDAZOLE | NA |
| 1 METHYLIMIDAZOLE | NA |
| 1,6-HEXANDIAMINE | NA |
| DIETHYLAMINE | NA |
| 4,4 TRIMETHYLENEDIPIPERIDINE | NA |
| MALEIC ANHYDRIDE | NA |
| N-METHYLDIETHANOLAMINE | NA |
| 4-METHOXYPHENOL | NA |
| TRIBUTYLAMINE | NA |
| DIETHANOLAMINE | NA |
| IMIDAZOLE | NA |

Ideally, a fastener-locking system should be capable of easy manufacture or assemblage by the user. It should be tack-free and sufficiently secure against inadvertent mixing of the resin and curing agent so that many fasteners can be shipped and stored in barrels or other containers without adhering to each other or becoming tacky to the touch. in the amount of work or input torque necessary to install the fastener. The adhesive should cure rapidly so that the fastener may be used after only a short cure period and provide a bond, such that substantially increased work or back off torque is required to remove the fastener. Desirably, also such a system should, in certain instances, be capable of reuse after removal of the fastener and the adhesive should provide some curing which would enable a fastener which has slightly loosened due to vibration or other stresses, to become refastened rather than dropping out of place.

Many of the above attributes are realized by the previously described invention of Wallace U.S. Pat. No. 4,847,113. The present invention, however, further expands upon the significant improvement of the Wallace U.S. Pat. No. 4,847,113 patent by providing formulations capable of providing even greater "shelf-life" and flexibility of use than those disclosed in the aforementioned patent. In addition, the compositions of the present invention exhibit a greater speed of cure, and have the advantage that they are stable to high heat. The significance of these advantages is discussed below.

It is thus an object of the present invention to provide an integral skin adhesive system, having enhanced shelf life, and being useful to seal and/or lock two substrates to one another.

SUMMARY OF THE INVENTION

Generally speaking, the present invention fulfills the above-described needs by providing an adhesive system capable of use to secure two substrates to one another. The adhesive system uses a resin and a hardener which are encased in a polymerized, integral film.

In particular, the invention fulfills these needs by providing a composition comprising a hardener-containing component which includes (a) a hardener capable of polymerizing a resin; (b) a UV-curable film-forming compound comprising a dimethacrylate; and (c) a photoinitiator compound capable, upon exposure to UV light, of curing the film-forming dimethacrylate (b) to form an integral, thin, continuous, dry, substantially pin-hole free, flexible, non-tacky outer protective skin.

The invention also includes the embodiment wherein the hardener-containing component is a fluid deposit having at least one surface bounded by an integral, thin, continuous, dry, substantially pin-hole free, flexible, non-tacky outer protective skin formed by the curing of the UV-curable film-forming dimethacrylate (b).

In particular, the invention also pertains to the embodiments wherein the hardener-containing component is microencapsulated.

The invention includes the embodiments wherein the above-stated compositions additionally comprise a resin-containing component which includes (1) the resin; (2) a UV-curable film-forming compound; and (3) a photoinitiator compound capable, upon exposure to UV light, of curing the film-forming compound (2) to form an integral, thin, continuous, dry, substantially pin-hole free, flexible, non-tacky outer protective skin; and wherein at least one of the group consisting of the resin-containing component and the hardener-containing component is microencapsulated.

The invention includes the embodiment of the above compositions wherein the resin-containing component, and the hardener-containing component are fluid deposits having at least one surface bounded by an integral, thin, continuous, dry, substantially pin-hole free, flexible, non-tacky outer protective skin formed by the curing of the UV-curable film-forming compound (2) or the film-forming dimethacrylate (b).

The invention further includes a fastener having, on at least one surface, a composition comprising a resin-containing component, and a hardener-containing component;

wherein the resin-containing component includes (1) a resin; (2) a UV-curable film-forming compound; and (3) a photoinitiator compound capable, upon exposure to UV light, of curing the film-forming compound (2) to form an integral, thin, continuous, dry, substantially pin-hole free, flexible, non-tacky outer protective skin;

wherein the hardener-containing composition includes (a) a hardener capable of polymerizing the resin (1); (b) a UV-curable film-forming compound comprising a dimethacrylate; and (c) a photoinitiator compound capable, upon exposure to UV light, of curing the film-forming dimethacrylate (b) to form an integral, thin, continuous, dry, substantially pin-hole free, flexible, non-tacky outer protective skin.

In particular, it includes such a fastener (such as a bolt, a screw, a rivet, a staple, a dowel, a peg, a nail, a nut, a washer, or a wire nut) wherein the resin-containing component, and the hardener-containing component are fluid deposits having at least one surface bounded by an integral, thin, continuous, dry, substantially pin-hole free, flexible, non-tacky outer protective skin formed by the curing of either of the UV-curable film-forming compound (2) or the film-forming dimethacrylate (b).

The present invention also includes, in a fastener provided with a lock-forming material to resist separation from a mating member, the lock-forming material being comprised of a first and a second deposit on a surface of the article, the first deposit comprising a fluid mixture of an uncured epoxy resin having throughout a radiation-curable, film-forming material, the second deposit comprising a fluid mixture of a curing agent for the uncured epoxy resin having throughout a radiation-curable film-forming material, a portion of the radiation-curable film-forming material extending throughout each mixture being in the form of an integral, thin, continuous, dry, substantially pin-hole free, flexible, non-tacky outer protective skin existing in and across the entire surface of each deposit, the skin being rupturable thereby to permit intermixing of the resin and the curing agent to cure the resin, the improvement comprising wherein the second film-forming material in the second deposit is a dimethacrylate, or mixtures thereof.

The invention particularly pertains to the embodiment wherein at least one of the group consisting of the uncured epoxy resin and the curing agent for the uncured epoxy resin is microencapsulated.

The invention also provides a method for producing a fastener having a lock forming material to resist separation from a mating member, the method comprising:
(A) applying, to a surface (I) of the fastener, a resin-containing component including (1) a resin; (2) a UV-curable film-forming compound; and (3) a photoinitiator compound capable, upon exposure to UV light, of curing the film-forming compound (2) to form an integral, thin, continuous, dry, substantially pin-hole free, flexible, non-tacky outer protective skin;
(B) applying, to a surface (II) of the fastener, a hardener-containing composition including (a) a hardener capable of polymerizing the monomer (1); (b) a UV-curable film-forming compound comprising a dimethacrylate; and (c) a photoinitiator compound capable, upon exposure to UV light, of curing the film-forming dimethacrylate (b) to form an integral, thin, continuous, dry, substantially pinhole free, flexible, non-tacky outer protective skin;
(3) irradiating the surfaces (I) and (II) with an amount of UV radiation sufficient to cause the film-forming compound (2) or the film-forming dimethacrylate (b) to form the integral, thin, continuous, dry, substantially pin-hole free, flexible, non-tacky outer protective skin.

The surfaces of the above-described deposits may be at least partially in contact with one another, or they may not contact one another. The present invention includes the embodiment wherein at least one of the group consisting of the resin-containing component and the hardener-containing component is microencapsulated.

Of particular interest are the embodiments of the invention wherein the dimethacrylate of the UV-curable film-forming compound (b) is selected from the group consisting of EBAD and HDDMA, and/or wherein the UV-curable film-forming compound (2) is selected from the group consisting of TMPTA, EBAD, and HDDMA.

BRIEF DESCRIPTION OF THE DRAWINGS

FIG. 1 is a diagrammatic plan view of an apparatus that may be used in the practice of the method, including the conveyor shown in FIG. 2.

FIG. 2 is a side elevational view of a twin belt conveyor which is part of the apparatus that may be used in the practice of the method of this invention.

FIG. 3 is a sectional view along the line 2—2 in FIG. 1.

FIG. 4 is an enlarged fragmentary view of a portion of a bolt showing the deposited material and the protective films thereover.

DESCRIPTION OF THE PREFERRED EMBODIMENTS

Figure 5:
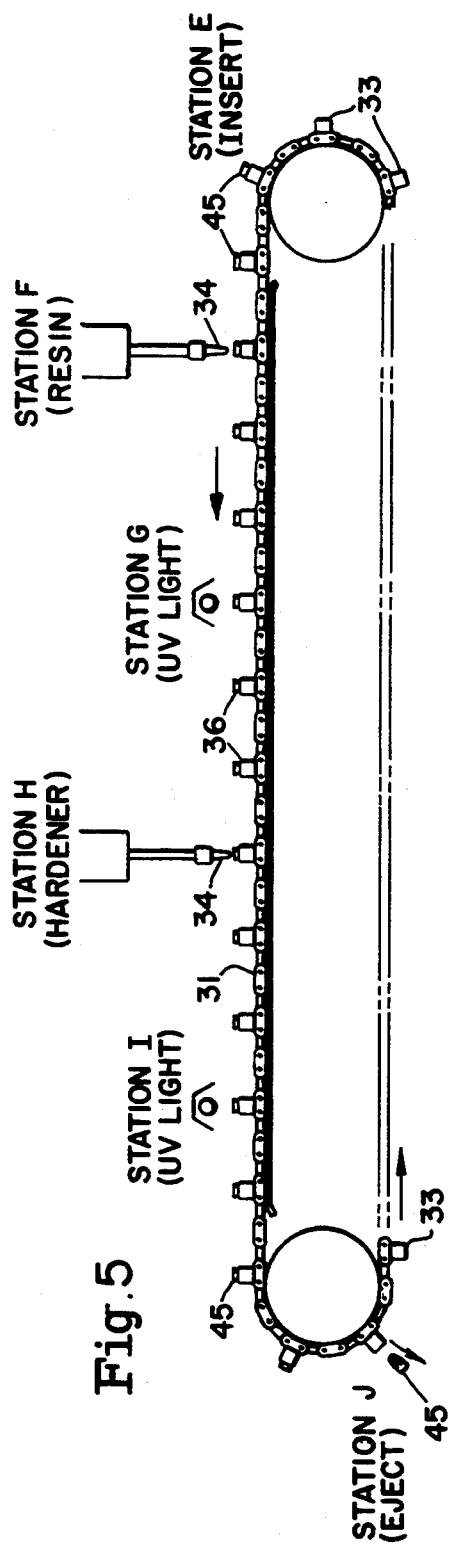
FIG. 5 is a diagrammatic plan view of an apparatus that may be used to produce wire nuts in accordance with the present invention.

A. The Compositions of the Adhesive System of the Invention

The adhesive system (lock-forming material) of the present invention is a fluid which contains low molecular weight constituents capable of being polymerized into a higher molecular weight solid. The system preferably contains an initiator of free radicals, a curing agent capable of being polymerized in the presence of such free radicals, a resin, and a hardener capable of reacting with the resin to effect hardening or curing of the resin.

The resin of the present invention is desirably of a nature which is capable of curing to adhesively resist separation of contacting substrates. It is important that the resin not be capable of being polymerized to any material extent through exposure to UV radiation. As stated, epoxy is a particularly preferred resin for the purposes of the present invention, a suitable example being a commercially available bisphenol A epichlorohydrin resin. The most preferred bisphenol A epichlorohydrin resin is an epoxy bisphenol A epichlorhydrin resin. Such a resin can be obtained by reacting bis phenol A and epichlorohydrin. The preferred resin of the present invention may also be obtained commercially (EPON 828 TM, Shell Chemical). This preferred resin is an uncrosslinked, short-chain prepolymer, rather than a monomer.

In general, the hardener of the present invention may be selected from reactive amines, preferably tertiary amines which have been found to be especially effective as hardening or curing agents for an epoxy resin. It is important that the hardener not be capable of being polymerized to any material extent through exposure to UV radiation. Most preferably, the compositions will additionally contain a "booster" hardener present in an amount of approximately 3–10%. An especially preferred booster hardener is benzyldimethylamine (BDMA). BDMA is preferred as a co-hardener because prior hardeners emitted a noxious odor and the well-known, strong but less offensive odor of BDMA counteracts such noxious odor.

As stated above, an initiator of free radicals is used in the present invention to polymerize a film-forming, curable agent, and thereby produce an integral skin over the resin and hardener compositions.

Most preferably, the polymerization of the film-forming agent is accomplished by a photochemical reaction mediated by ultra-violet radiation (UV curing) or ionizing radiation (as by electron beam curing) and a photoinitiator of free radicals. Because of the higher investment costs of electron beam curing, this technology is less preferred than UV curing.

Photochemical methods of polymerization have substantial advantages over other drying procedures: they allow a savings of raw materials, they minimize the pollution of the environment due to evaporation of solvent, and, since no energy is required for evaporation, they lead to a more economical process. Photochemical polymerization also results in a high rate of curing, as characterized by low thermal stress on the substrate (therefore permitting coating on heat-sensitive materials). The procedure requires little space or surface area and may be readily fitted into other parts of a production sequence.

In general, UV light of a wave length of 200–400 nanometers is employed to induce polymerization. The energy of the UV light is absorbed by a photoinitiator, which is capable of converting the light energy into free radicals. The presence of the free radicals initiates a chain reaction which converts reactive monomer compounds into oligomers and ultimately into polymers. The radiation energy required for the formation of free radicals typically is in the range of 350–410 kJ/mole. Most preferably, the intensity of the emission range of the UV lamp should be high as possible. Medium-pressure mercury lamps are generally suitable for the purposes of the present invention. Although it is possible to affect UV curing through prolonged or continuous exposure to a UV lamp, very short, discrete high-energy light flashes can also be employed. An advantage of this method is longer lamp life when compared to continuous UV radiation operations.

To enable the light energy to be transferred to the photoinitiator molecule, the wave length of the incident light must be within the absorption range of the initiator. In order for a photoinitiator to be commercially successful, it must exhibit high reactivity which is tantamount to a low and hence economical concentration in use. Moreover, it must have adequate storage stability of both the initiator and the finished formulation (in the dark). Most preferably, the photoinitiator will have a liquid physical state, thereby facilitating its incorporation into the adhesive compositions. At the same time, the liquid physical state has the effect of reducing the viscosity of the system. Desirably, the photoinitiator will not yellow and thus will not detract from the color stability of the cured film. The photoinitiator should have an absence of odors both before and after curing and should have physiological acceptability. It should exhibit a high absorption capacity for incident light, a high quantum yield for the formation of effective starter radicals, and high transition probability for single state ($S_1$) to triplet state ($T_1$) transitions. It is possible to employ photoinitiators which act by hydrogen abstraction from radical formation (by inter-molecular hydrogen transfer from a co-initiator to the excited triplet initiator molecule). Alternatively, compounds which undergo intramolecular splitting with radical formation due to decomposition of the excited triplet initiator molecule may be employed. The latter compounds are the preferred photoinitiators of the present invention.

Thus, photochemical initiation can be used with carbonyl compounds such as ketones. Although both aliphatic and aromatic ketones have been used, aromatic ketones have been found to be more useful in commercial practice since their absorptions occur at longer wave lengths and their quantum yields are higher. Benzophenone and acetophenone (and their derivatives) are the most commonly encountered simple ketones. Such molecules undergo homolysis by either fragmentation or by hydrogen abstraction.

In addition, photoinitiators such as transition metal chelates, organo-metallic derivatives of transition metals (e.g. $Mo(CO)_6$ and ferrocene), and 9-phenylacridine/ether may be employed. A variety of photoinitiator dyes may be alternatively be employed. Examples of such dyes include methylene blue, thionine, fluorescein, and eosin, etc.

Any, of a variety of photoinitiator agents may be used in accordance with the present invention. Examples of such photoinitiators include the simple ketones discussed above, benzil, Michler's ketone, thioxanthraquinone, benzoin, benzoin ethers, alphadialkoxyacetophenones, alpha acyloxime esters, benzil ketals, hydroxyalkylphenones, alphahalogenoketones, aromatic ketones, alkyl aryl ketones, oxime esters, halogenated thioxanthones, Onium salts, fluoborates, peroxides, azo free radical generators, and promoters like tertiary amine accelerators, organometallic complexes and mixtures of the above, etc.

Liquid hydroxyalkylphenones represent the most recent and very promising development in the field of photoinitiator chemistry. The hydroxyalkylphenones molecule excited by UV light can, from a relatively short lived triplet state, decompose by an alpha splitting reaction to give a benzoyl radical and a two hydroxy-2-propyl radical. The latter radical forms acetone upon removal of hydrogen. Hydroxyalkylphenones are particularly suitable for use as transparent lacquers since no yellowing of the cured coating occurs. Hydroxyalkylphenones are the preferred photoinitiators of the present invention. In particular, the hydroxyalkylphenone, 2-hydroxy-2-methyl-1-phenolpropanone (Darocur 1173 ™) is preferred. The structure of this hydroxyalkylphenone and its UV-induced photolysis are shown below ($\phi$ represents a 6 carbon aromatic ring).

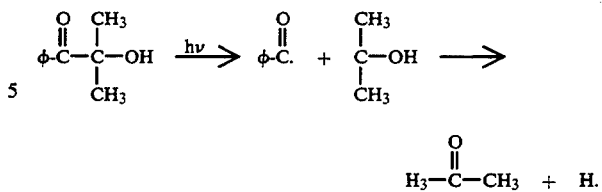

As indicated above, the photoinitiator compound is employed to accomplish the polymerization of a polymerizable, UV-curable, film-forming monomer agent. Typical monomers that may be used with the epoxy liquid include chemical compounds which are classified as acrylic esters, methacrylic esters, vinyl esters, vinyl ethers, acrylic ethers, allyl esters, allyl ethers, epoxides, styrene, and substituted styrenes, vinyl pyrrolidone, acrylamide, and substituted acrylamides, acrylonitrile and dienes. As disclosed in Wallace U.S. Pat. No. 4,847,113 the monomer trimethylopropane triacrylate (TMPTA) is a particularly good monomer when incorporated into compositions with epoxy resins. However, as described above, the use of TMPTA has been found to react with certain epoxy hardeners (such as the epoxy hardener NX-3 (2,4,6 tri-dimethylaminomethylphenol) to diminish shelf-life of such a liquid. Thus, while TMPTA may still be used successfully with the epoxy liquid, in accordance with this invention, it should not be used in the hardener liquid. In certain other embodiments of this invention, it will be replaced in both liquids.

The subject invention is based upon the unexpected finding of a unique group of replacements for the TMPTA, which, when used with the epoxy liquid have at least equal shelf-life as when TMPTA is used, and at the same time have significantly increased shelf-life when used as the film forming agent of the hardener liquid. This group of film formers is described more fully herein below. They are any dimethacrylate capable of effecting skin formation when subjected to UV or other types of radiation as described above, but which do not react with the epoxy or hardener to any material extent so as to decrease shelf life.

The use of the compositions of the present invention also provides other unexpected advantages. The time needed to cure the skin on the hardener and resin compositions is substantially less than in the TMPTA formulations. Thus, it is possible to effect a cure using only one UV light rather than the two UV lights which were employed when using TMPTA formulations.

Even more substantial is the unexpected heat stability of the EBAD-containing formulations. As will be appreciated, it is desirable that the formulations have a viscosity which permits them to be flowable, in order that they may be readily applied to a surface. After such application, it is desirable that the compositions have substantial viscosity, in order that they may provide a more rigid mechanical support for the film which is to cover them. These opposing constraints are typically addressed by heating a formulation (thus decreasing its viscosity) prior to applying it to a substrate, and then permitting it to cool to a more viscous form. Unfortunately, it has been found that the properties of the TMPTA-formulations are impaired by heating above 110° F. Thus, in order to achieve an acceptable application of the formulations, it was necessary to employ less viscous TMPTA-containing formulations than would otherwise be desired.

achieve effective results when used as the film forming ingredient in the practice of this invention.

| Trade Name | ABRV./ Code Name | Inhibited | Company Name |
|---|---|---|---|
| 1,6-HEXANEDIOL HDODA | SH 903 | 224 ppm MEHQ | INTEREZ INC. |
| DIACRYLATE2-HYDROXYETHYLMETHACRYLATE | | | ROHM TECH. |
| ACRYLRON MFP | | | SYNTHROM INC. |
| B-CEA | | | RADCURE |
| CYRACTJRE UVR-6110 | | | UNION CARBIDE |
| DIPENTAERYTHRITOL HYDROXYPENTAACRYLATE 399 | | | SARTOMER CO. |
| ETHOXYETHOXY ETHYL ACRYLATE 256 | | | SARTOMER/ARCO CHEMICAL CO. |
| GLYCERYL PROPOXY TRIACRYLTE | GPTA | YES | INTEREZ |
| HDODA | | | ALCOLAC |
| HYDROXYPROPYL-METHACRYLATE | BM 955 | 216 ppm MEHQ | ROHM TECH. |
| ISOBORNYL ACRYLATE | IBOA | UNKNOWN | ALCOLAC |
| ISOBORNYL-METHACRYLATE | D-1087 | 220 ppm MEHQ | ROHM TECH. |
| ISOBUTYL-METHACRYLATE | AM 105 | 100 ppm MEHQ | ROHM TECH. |
| METHACRYLIC ESTER 13, 0 | BM 717 | 100 ppm MEHQ | ROHM TECH. |
| OCTYL/DECYL ACRYLATE | ODA | YES | INTEREZ INC. |
| PENTAERYTHRITOL ACRYLATE | | | SARTOMER |
| PENTAERYTHRITOL TRIACRYLATE | PETA | YES | INTEREZ |
| PHOTOGLAZE | CD4416-35 | | LORD CORP. |
| | RD3254-11 | | LORD CORP. |
| PHOTOGLAZE IC | IC5001-35 | | LORD CORP. |
| PHOTOMER 1028 | | | HENKEL |
| PHOTOMER 1127 | | | HENKEL |
| PHOTOMER 1149 | | | HENKEL |
| PRO 261 | | | SARTOMER CO. |
| SIPOMER HEM VHP HYDROXYETHYL- METHACRYLATE | | | ALCOLAC |
| SIPOMER HEM-D | | UNKNOWN | ALCOLAC |
| SIPOMER HEM-HP-T | | | ALCOLAC |
| SIPOMER HPM | | UNKNOWN | ALCOLAC |
| TETRAETHYLENE GLYCOL DIACRYLATE | TTEGDA | YES | INTEREZ INC. |
| TMPTA 351 | | | SARTOMER |
| TRIMETHYLOLPROPANE ETHOXY TRIACRYLATE | | TMPEOTA | YESINTEREZ INC. |
| TRIMETHYLOLPROPANE TRIACRYLATE | RJX-89217-A | | RADCURE |
| | RJX-89217-B | | RADCURE |
| | RJX-89217-C | | RADCURE |
| | TMPTA | YES | INTEREZ INC. |
| TRIPROPYLENE GLYCOL DIACRYLATE | TRPGDA | YES | INTEREZ INC. |
| TRPGDA | | | ALCOLAC |
| V-PYROL (N-VINYL-2-PYRROLDONE) | | | GAF CHEMICAL CORP. |
| VINYL ACETATE | | HYDRO-QUINONE | HOECHST CELANESE |
| CMD 6600 | | | RAD CURE (Interez) |
| CMD 8600 | | | RAD CURE (Interez) |
| ACRYLATE ACID | | | CHEMICAL DISTRIBUTOR |

In contrast, EBAD-containing formulations are highly stable to heat. They are able to withstand temperatures of 200° F. or more. Thus, a highly viscous material can be made, and optimally heated to 140°–150° F. for application to the substrate. At this temperature, the material has desirable flowability, and can readily set into the threads and grooves of bolts and the like. Moreover, the decreased viscosity of the heated compositions permits one to apply more material to the substrate; this thus results in thicker deposits which are better able to support the U. V.-induced film.

Evidencing the unexpected results achieved by the use of these dimethacrylates, is the following list of related or quasi-related compounds which failed to As stated above, one aspect of the present invention derives from the discovery that dimethacrylates, and preferably, the dimethacrylates, ethoxylated bisphenol A dimethacrylate (EBAD) and 1,6 hexanediol dimethacrylate (HDDMA) can provide substantially increased shelf-life, time of cure, and heat stability, to compositions, particularly those containing the NX-3 hardener. The structures of these compounds are shown below:

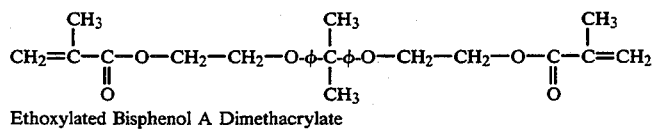
Ethoxylated Bisphenol A Dimethacrylate

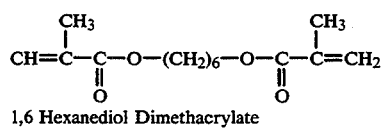
1,6 Hexanediol Dimethacrylate

Particularly preferred, in this respect, is EBAD, which has proven to provide excellent film-forming (e.g. skin forming) capabilities, and is unreactive with the epoxy or hardener of this invention so as to give shelf-life substantially beyond that of TMPTA formulations, often exceeding 3 months, and at times upwards of one year or more (by acceleration testing). In addition, this composition has, as described above, improved time of cure, and the heat stability of the compositions, As will be appreciated, the compositions of the present invention may additionally contain dyes or pigments to color the patches once applied in accordance with this invention.

Significantly, however, the compositions of the present invention do not require dyes or other opacifiers such as are required by Thompson (U.S. Pat. No. 4,632,944). As will be appreciated, the inclusion of opacifiers in the Thompson compositions was essential in order to permit the compositions to be used for subsequent fastening of substrates. Such opacifiers are not needed in the present invention since unexpectedly, it has been found that the extent of polymerization may be controlled by varying either the dose of UV light received by the compositions, or the concentration of dimethacrylate (e.g. EBAD) employed to form the compositions. The concentration of dimethacrylate influences both the capacity to form the polymerized film, and the extent to which the polymerized dimethacrylate at the composition surface can shield internal dimethacrylate from being polymerized by the UV light.

In a preferred embodiment, the resin-containing composition will be formulated to contain between 15-74% resin, 20-75% UV-polymerizable monomer, and 1-10% UV activated photoinitiator. Preferred formulations of the resin composition are described in U.S. Pat. No. 4,847,113 herein incorporated by reference. However, for convenience of inventory, TMPTA may be replaced by EBAD or HDDMA here.

The hardener compositions of the present invention are desirably formulated to contain approximately 75-85% hardener, 14-24% UV-polymerizable monomer, and 1-5% photoinitiator. The most preferred formulation for the hardener composition contains 80% hardener compounds of which 90-97% are the hardener NX-3 and 3-10% are the booster BDMA. The remaining 20% of the formulation is preferably composed of EBAD (97%) and the photoinitiator (3%).

B. Uses of the Adhesive System

The compositions of this invention have a number of advantages over prior compositions, particularly those of the TMPTA cover coat type discussed above (Wallace, U.S. Pat. No. 4,847,113). Among the advantages are:

(a) the advantage of the elimination of a second overcoat as achieved by Wallace U.S. Pat. No. 4,847,113, as well as the integral, continuous, pinhole free nature of its film, are achieved by this invention;

(b) the ability to substantially reduce the overall length of the conveyor apparatus used to practice the subject invention, as well as increase the speed of the conveyor as compared with the invention of Wallace U.S. Pat. No. 4,847,113, due to the elimination of the need for a second ultra-violet irradiation station;

(c) the increase in torque values, in many cases, by as much as 5% or more due to the use of the aromatic multi-functional dimethacrylate (e.g. EBAD);

(d) the elimination of the offensive odor associated with the manufacture of prior self-locking fasteners due to the use of BDMA; and perhaps most importantly, (e) the significant increase in the shelf-life of both the resin and the hardener deposits with their protective skin as an integral part of their respective surfaces. The shelf-life is extended well beyond six weeks, and it is believed that it may well, in many instances, be as high as 1 year or more (as has been determined by accelerated aging tests), (f) the substantial increase in the rate of UV-mediated curing over those of the prior art. This increase has permitted greater rates of production, since the period of exposure to UV light can be reduced, (g) the substantial heat stability of the compositions permit them to be formulated so as to be more viscous at room temperature than was possible with the TMPTA compositions without sacrificing flowability and efficiency of application to a substrate. This advantage permits the deposits to have improved mechanical stability and to provide increased support to the UV-induced films.

In fact, in many of the preferred embodiments, those factors of shelf life, rate of cure, heat stability, increased production rates and high sheer strength are optimized to an extent considerably higher than heretofore achieved in prior, known self-locking fasteners.

The adhesive system of the present invention is versatile, and capable of multiple different applications to lock two substrates to one another.

In one embodiment, the adhesive system is applied to a "fastener" (e.g. a bolt, screw, rivet, staple, "toggle bolt," dowel peg nail or the like) The compositions of the present invention are said to be applied or deposited on a fastener if either (1) both the resin and the hardener component is applied to the same article (such as a screw, bolt, etc.) or (2) one of the components is applied to one article and the complimentary component is applied to a mating article. Thus, for example, as used herein, the compositions of the present invention are said to be applied to a bolt if the bolt contains both components, or if one component is applied to the bolt, and the complimentary component is applied to a nut usable to fasten the bolt to a support.

The adhesive system may be used to fasten any two surfaces capable of close contact (such as, for example, the surfaces of furniture, glass, plastic, stone, mortar, asphalt and other sheets (such as roofing shingles) and rubber or latex and the like) in the absence of or in combination with an additionally added fastener.

Where a fastener means is to be employed, the adhesive system of the present invention may be applied in any of a variety of manners. For example, both the resin and the hardener compositions may be applied to the fastener. Such application may either be in the form of two discrete applications or "patches," or may be by layered application to the same region of the fastener. Alternatively, the epoxy liquid, the hardener liquid, or both, may be applied to the fastener in a microencapsulated form. In order to accomplish the layering of the resin and hardener composition, either composition is first applied to the fastener, and then the fastener means is subjected to UV or other curing to form an integral skin over the applied composition. After the skin has formed, the second composition (i.e. the hardener or resin, respectively) is then applied and a second curing treatment is administered. Where both the hardener and resin are applied in discrete regions, curing may be effected by a single curing treatment.

The present invention also contemplates the use of fastening systems in which the fastener is coated with either the resin or hardener, and where the substrate to be fastened has been coated with the complimentary composition (i.e. the hardener or the resin, respectively).

The present invention further contemplates the use of fastening devices which are composed of the adhesive system itself. For this purpose, the compositions are preferably layered one upon the other to form a single sheet of composition which, may then be cut or formed to produce adhesive sheets, disks, annular rings (such as washers) and the like. Such adhesive sheets may contain perforations to promote contact of the resin and hardener compositions. Alternatively, such adhesive sheets and the like may be formed by placing the multiplicity of closely spaced patches of resin and hardener. More preferably, the compositions will be applied to a supportive substrate (such as sheet metal, washers, and the like) with the adhesive.

Where desired, such adhesive films may be incorporated or applied to a substrate such as a plate, washer, wire nut, etc. so as to provide additional mechanical stability and strength. In a preferred example of this embodiment, such supports comprise washers, especially plastic, vinyl, teflon or metal washers. The support may be solid such as a sheet of metal or may alternatively be composed of a grid, screen, or similar support.

As stated above, the adhesive system of the present invention may be used to join two substrates even in the absence of additional fastening means. Thus, for example, the hardener or resin may be applied to one surface of a chair, table, or other article of manufacture, with the complimentary compound being applied to the mating surface. Adhesion is accomplished by placing both of the coated surfaces in contact with one another and then by rupturing the integral films through the application of pressure and/or torque.

The use of the adhesive system of the invention lessens the loosening effects of vibration. Moreover, because of the ability of the adhesive system of the present invention to aid as a sealant of fluids, it may be employed in circumstances in which one wishes to fasten a fluid receptacle (such as a gasoline tank, water reservoir, etc.) to a support. Since the sealant is capable of withstanding pressures from a fluid, it may be employed in applications in which pressure sealing is required.

In summary, the preferred adhesive system of this invention, offer the following advantages: excellent shelf life, good economy, good torque values, increased production rates and high sheer strength.

C. Apparatus for Producing the Fasteners of the present invention

The apparatus used to manufacture the fasteners of the present invention are illustrated by the following examples.

1. Apparatus for Coating Fasteners

FIG. 1 illustrates a typical process and apparatus which use the subject inventive compositions for making self-locking fasteners. With reference to this FIG. 1, a series of threaded fasteners or bolts 10 is supplied by conventional apparatus to conveyor 5. Conveyor 5 comprises a pair of horizontal, laterally spaced, parallel belts 12 between which bolts 10 are suspended by their heads. Conveyor belts 12 are moved by a conventional, well-known drive means (not shown) in the direction of arrow Z. The individual bolts 10 are supplied by a conventional means (not shown) to the conveyor belts 12 at loading station A. Such an overall conveying system is conventional and well known in the art.

At loading station A, bolts 10 are at ambient temperature, which may be assumed to be about 70° F. In practice, bolts 10 may be supported with their heads in contact with one another, although they are shown spaced apart.

Bolts 10 then proceed from station A to station B in the direction at arrow Z where bolts 10 are heated by heaters 18. The preferred heaters 18 are conventional, open-flame or induction heaters. Preferably, the temperature of bolts 10 is raised between stations A and B to about 90° F.

At station B, applicators 14 and 16 on opposite sides of the belt conveyor deposit controlled amounts of fluid material onto opposite sides of the threaded portions of bolts 10. The preferred applicators 14 and 16 are conventional foam rubber rollers with the dimensions of the rollers being dependent upon the amount of fluid material to be applied to fasteners 10 and the size of fasteners 10. Alternatively, brushes or spray applicators may be employed.

Fluid deposit 15 (see FIG. 4) applied to one side of bolts 10 by applicator 14 is a mixture of uncured resin, film-forming ultraviolet curable material (such as TMPTA, EBAD, HDDMA, or the like) and a photoinitiator.

The fluid deposit 17 applied to the opposite sides of the bolts by the applicator 16 is a mixture of curing agents or hardeners, a suitable multi-functional amine (preferably BDMA), the film-forming ultraviolet curable material (such as EBAD, HDDMA, or a mixture thereof), and a photoinitiator (preferably, the same photoinitiator as is used in deposit 15).

The fluid deposits should have a viscosity such that they flow down into thread grooves 20 (see FIG. 4) and laterally along thread grooves 20, remaining essentially at the axially located zones of deposition, which may extend for several threads along the bolt. That portion of the ultraviolet curable material in each deposit which is near or at the surface of the deposit forms a very thin, continuous coating 26, 28 (FIG. 4).

The viscosity of the deposits may be lowered by heating the deposits, preferably to 140°-150° F., prior to applying them to the substrate. This improves the flowability of the compositions into the threads of the bolts. Upon cooling, after deposition, the viscosity of the formulations increases, and they attain the mechanical rigidity desired to support the UV-induced film.

Heat is again applied after the bolts move beyond applicators 14 and 16, by heaters 19. Again, the preferred heaters 19 are conventional, open-flame or induction heaters.

The preheat of the bolts by heaters 18 and the post heat by heaters 19 warms the bolts and the deposits and assists in the desired flow of the deposits into the thread grooves 20. This "lay down" of the deposits also improves the appearance of the coated bolt. Heaters 18 and 19 are optional and are used only when necessary to achieve the desired flow and "lay down." When the method is carried out in a warm environment, as in summertime, both preheat and post heat may not be needed and can be omitted.

Fasteners 10 continue their movement on the conveyor in the direction of arrow Z past station C where ultraviolet cabinets 22 and 24 are located on opposite sides of conveyor belts 12. The sources of ultraviolet radiation preferably are elongated, ultraviolet, radiating tubes, backed by reflectors, and positioned on both sides of the conveyor beneath conveyor belts 12 and rated at 300 watts per inch, or the like. The rate of advance of bolts 10 is such that the deposits 15, 17 on opposite sides of the bolts are exposed to high intensity radiation at station C for only a very few seconds as, for example, less than 5 seconds, and preferably between 2 and 4 seconds.

The effect of the ultraviolet radiation at station C is to convert the ultraviolet curable material at the surface of the deposits 15 and 17 to fully cured and set films or skins 26 and 28.

Generally, the radiation emitted by ultraviolet cabinets 22, 24 is absorbed by the film-forming ultraviolet curable material, and results in the conversion of part of the fluid deposits 15, 17 into solid films 26, 28, respectively.

The films or skins 26 and 28 formed over deposits 15 and 17, respectively, by this process are extremely thin, flexible, dry, non-tacky and continuous, integral films, lacking any pin holes associated with prior covering methods.

Bolts 10 then pass a final cooling station in which conventional industrial blowers 40 are used to reduce or remove any heat build-up that may have resulted from exposure to the ultraviolet lights and to better prepare the bolts for deposit in bulk shipping containers 42 at the end of conveyor 12 immediately after the radiation treatment. Cooling air raises the viscosity of the deposits which gives support to and strengthens skins 26, 28 so that the deposits 15, 17 remain intact when bolts 10 are discharged into the containers 42 and the bolts do not stick together.

Preferably, the ultraviolet curable material mixed with the curing agent of deposit 17 is made up a mixture of a dimethacrylate and a photoinitiator. As stated earlier, the preferred dimethacrylates for the hardener are EBAD and HDDMA. EBAD is particularly preferred. Many other ultraviolet curing compounds were tested with the other components in the resin deposits 15 and curing agent deposits 17 but, only this class of compounds was found to be compatible with the components in the hardener deposits. The other curing compounds were not compatible with the other components of deposit 17 because the UV curing compounds spontaneously polymerized with the compounds of the deposit which immediately created an undesirable solid deposit rather than a liquid deposit. Also, the other UV curing compounds would not create the desirable film over the deposits when subjected to ultraviolet light. Finally, the other UV curing compounds would adversely affect the film formed over the deposits by deactivating the epoxy polymerization mechanism.

Particularly preferred compositions for use as deposits 15 and 17 are comprised, by weight, of the following ingredients:

| Resin Deposit 15 | Hardener Deposit 17 |
| --- | --- |
| 15%–74% EPON 828 TM | 70%–77% NX-3 |
| 20%–75% EBAD | 3%–10% BDMA |
| 1%–10% 2-hydroxy-2-methyl-1-phenolpropanone | 19% EBAD |
| | 1% 2-hydroxy-2-methyl-1-phenolpropanore |

In the foregoing, a mass production method has been described in which the uncured fluid resin and a mixture of fluid actuators or hardeners are deposited on a threaded zone in side-by-side relation, each deposit included an ultraviolet curable material which when subjected to ultraviolet light forms a protective film over deposits 15 and 17.

It is to be emphasized that there is no criticality to the order of applying the deposits. The present invention employs the terms "first" and "second" deposits solely as an aid in referring to the process, and not to prescribe any limitations on the order with which the components of the present invention are applied to an article. Indeed, the components may be applied in either order, or may be applied simultaneously.

In addition to the above-described methods, the invention is also applicable to mass production of threaded articles in which the resin and/or hardener may be micro-encapsulated. In accordance with this aspect of the present invention, the material to be deposited may contain a mixture of micro-encapsulated uncured fluid resin and fluid hardeners or curing agents, a liquid photoinitiator, and a liquid ultraviolet curable material. The hardener composition may be micro-encapsulated instead of the resin composition. Alternatively, and more preferably, both compositions will be micro-encapsulated. Microencapsulation may be achieved by means known in the art.

A microcapsule containing the epoxy resin component of the adhesive will preferably contain a bis phenol A resin. A microcapsule containing the hardener component of the adhesive will preferably contain the hardeners NX-3 and BDMA.

Most preferably, a composition containing microcapsules of hardener and microcapsules of epoxy resin are applied to a surface of a fastener as a mixture in a liquid which contains a UV-curable, film forming dimethacrylate (most preferably EBAD) and a photoinitiator agent (most preferably 2-hydroxy-2-methyl-1-phenolpropanone). By exposing this liquid to UV light, a film is formed over the mixture of microcapsules.

The preferred process of producing fasteners having microencapsulated compositions is illustrated below with reference to FIGS. 1–4. In accordance with this aspect of the invention, a mixture of resin-containing microcapsules and/or hardener-containing microcapsules is applied to bolts 10 in a single liquid containing the ultraviolet curable material and photoinitiator agent. Where both materials are microencapsulated, a capsules are applied in a binder. Prior to this application, bolts 10 have been heated by heaters 18 as they pass an applicator station B. The liquid is preferably applied to one side of bolts 10. Also, it is to be understood that this mixture can be applied to bolts 10 and to nuts (not shown) which will engage the threads of bolt 10 to create a self-locking fastener. Fluidity and viscosity are adjusted by well-known chemical treatment means (preferably heat) to prevent substantial flow axially across the thread grooves, to provide enhanced mechanical support for the film, for ease of printing, and to enhance the location stability of the deposit.

Substantially immediately after application of the fluid mixture, the fluid is exposed to a very brief radiation treatment by ultraviolet lamps at station C (e.g. approximately 1–4 seconds). The ultraviolet sensitive material at the surface of the fluid sets into an integral extremely thin, flexible, dry, non-tacky, pin-hole free, protective cover films 26 and 28 over the microencapsulated deposit, so that bolts 10 do not stick together. Protected by the film is the mixture containing the resin microcapsules and the hardener microcapsules. These microcapsules are separated from one another to prevent premature mixing and curing of the resin.

The fluid deposit is protected by a film which is formed substantially immediately following the application of the deposit, so that no protracted drying period is necessary. The radiation curable material serves the purpose of holding the mixture together in a fluid slurry until the protective film is formed.

When bolt 10 having deposits as herein described, in which both the resin and hardeners have been microencapsulated, is engaged in a mating threaded member, the micro-capsules rupture so that the resin and hardeners mix together, cure the resin to a solid state and produce a thread lock. The protective film over the deposit breaks up and "balls" up and assists in rupturing the capsules.

2. Apparatus for Providing Self-Locking Wire Nuts

Figure 6:
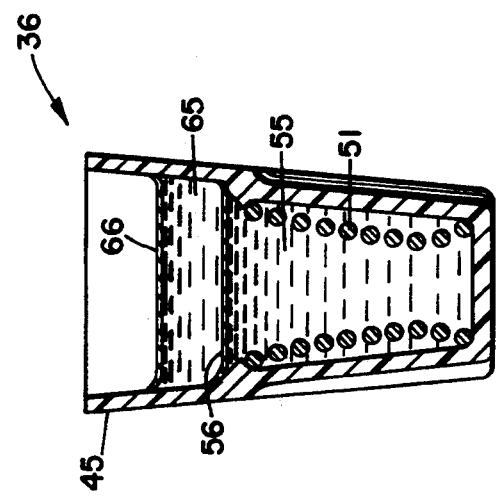
FIG. 6 is a diagrammatic illustration of a cross-section of a wire nut.

A typical machine for producing wire nuts containing the adhesives of the present invention is illustrated in FIG. 5. In such an apparatus, a conveyor belt, or chain 31 is employed which contains a plurality of nests 33 (preferably 124) capable of securely holding an inserted wire nut 45. A cross-sectional diagram of such a wire nut is shown in FIG. 6. The chain 31 is capable of moving the nests 33, via an indexing means, at an indexed rate of, for example, 1-5 nests per second. A wire nut assembly 45, preferably containing an inserted spring 51 to provide additional tension for the locking mechanism is inserted into an empty nest 33 at station E of the wire nut machine to form a nested wire nut assemblage 36. The nested wire nut 36 is then moved to station F where a suitable amount of resin composition 55 is added with a resin filling nozzle 34. In the most preferred embodiment, the resin fill 55 shall be sufficient to substantially or totally cover the spring mechanism 51 of the nested wire nut 36.

The nested wire nut 36 is then moved to station G where it is subjected to ultra-violet irradiation (preferably at a fluence of 200 watts per square inch). After UV radiation, the nested wire nut 36 is moved to station H where a hardener composition 65 is added to it. Because the previous exposure to UV irradiation has resulted in the formation of an integral film 56 over the resin fill 55, the applied hardener composition 65 does not mix with the resin fill 55, but rather forms a layer 65 above it. The nested wire nut 36 is then carried to station I which provides the additional UV radiation needed to cure the hardener composition and form an integral skin 66 over the hardener composition 65. The nested wire nut 36 is then ejected from the chain mechanism 31 at station J.

When the wire nut 45 having deposits as herein described, is engaged with a wire, the resin and hardener layers mix together, cure the resin to a solid state and produce a wire lock. The protective film over the deposit breaks up and "balls" up and assists in rupturing the capsules.

In the foregoing, a mass production method has been described in which the uncured fluid resin and a mixture of fluid actuators or hardeners are deposited within a nested wire nut 36 in a layer-upon-layer relation, each deposit included an ultra-violet curable material which when subjected to ultra-violet light formed a protective film over deposits 55 and 65. However, the present invention is also capable of being carried out by the use of microencapsulated formulations. Where such microcapsules are employed, a shearing force is needed to rupture the capsules in order to achieve the goals of the invention.

In accordance with this embodiment of the invention, the material to be deposited may contain a mixture of micro-encapsulated uncured fluid resin and fluid hardeners or curing agents, a liquid photoinitiator, and a liquid ultraviolet curable material. The hardener, instead of the resin, may also, if desired, be microencapsulated, or both may be micro-encapsulated. The resin, hardeners, photoinitiator and ultraviolet curable material are of the same material as heretofore described.

The mixture of resin and hardeners, at least one of which is micro-encapsulated, and including the ultraviolet curable material and photoinitiator may be applied to the nested wire nut 36.

Substantially immediately after application of the fluid mixture, the mixture is exposed to a very brief radiation treatment by ultraviolet lamps at station I (e.g. approximately 2-4 seconds). The ultraviolet sensitive material at the surface of the deposits sets into an integral extremely thin, flexible, dry, non-tacky, pin-hole free, protective cover films encasing the resin 55 and hardener 65 compositions, Since the resin or hardeners or both have been micro-encapsulated, the resin and hardener are separated from one another and premature mixing and curing of the resin is thus avoided.

The fluid deposit is protected by a film which is formed substantially immediately following the application of the deposit, so that no protracted drying period is necessary. Even if both the resin and hardeners are micro-encapsulated, the radiation curable material serves the purpose of holding the mixture together in a fluid slurry until the protective film is formed.

When the wire nut 45 having deposits as herein described, in which one or both the resin and hardeners have been micro-encapsulated, is engaged with a wire, the micro-capsules rupture so that the resin and hardener mix together, cure the resin to a solid state and produce a wire lock. The protective film over the deposit breaks up and "balls" up and assists in rupturing the capsules.

Once given the above disclosure, many other features, modifications and improvements will become apparent to the skilled artisan. Such features, modifications and improvements are, therefore, considered to be a part of this invention, the scope of which is to be determined by the following claims.

What is claimed is:

1. An adhesive system, comprising:
   a fluid deposit consisting essentially of a hardener capable of polymerizing a resin, said hardener having throughout a UV-curable film-forming dimethacrylate and a photoinitiator compound capable, upon exposure to UV light, of curing said film-forming dimethacrylate to form an integral, thin, continuous, dry, substantially pin-hole free, flexible, non-tacky outer protective skin; and
   an integral, thin, continuous, dry, substantially pin-hole free, flexible, non-tacky outer protective skin bounding at least one surface of said first fluid deposit formed by exposing a portion of said first fluid deposit to UV light.

2. The adhesive system of claim 1, wherein said UV-curable dimethacrylate is selected from the group consisting of ethoxylated bisphenol A dimethacrylate and hexanediol dimethacrylate.

3. The adhesive of claim 1 wherein, said first fluid deposit is microencapsulated.

4. The adhesive system of claim 1, wherein said fluid deposit comprises about 75–85% hardener, 14–25% UV-curable film-forming dimethacrylate selected from the group consisting of ethoxylated bisphenol A dimethacrylate and hexanediol dimethacrylate, and about 1–5% of said photoinitiator.

5. The adhesive system of claim 1, wherein said fluid deposit comprises about 70–77% tridimethylaminomethylphenol, about 3–10% benzyldimethylamine, 19% ethoxylated bisphenol A dimethacrylate and about 1% of said photoinitiator.

6. An adhesive system comprising:
a first fluid deposit;
said first fluid deposit consisting essentially of an uncured epoxy resin having throughout a radiation-curable, film-forming material and a photoinitiator capable, upon exposure to UV radiation, of curing said film-forming material to form an integral, thin, continuous, dry, substantially pin-hole free, flexible, non-tacky outer protective skin;
a first integral, thin, continuous, dry, non-tacky outer protective skin of selected thickness bounding at least one surface of said first fluid deposit formed by exposing a portion of said first fluid deposit to UV radiation;
a second fluid deposit integral with said first fluid deposit;
said second fluid deposit consisting essentially of a curing agent for said uncured epoxy resin having throughout a radiation-curable, film-forming dimethacrylate and a photoinitiator capable, upon exposure to UV radiation, of curing said film-forming dimethacrylate to form an integral, thin, continuous, dry, substantially pin-hole free, flexible, non-tacky outer protective skin; and
a second integral, thin, continuous, dry, non-tacky outer protective skin of selected thickness bounding at least one surface of said second fluid deposit formed by exposing a portion of said second fluid deposit to UV radiation.

7. The adhesive system of claim 6, wherein said UV-curable film-forming material of said first fluid deposit is selected from the group consisting of trimethylopropane triacrylate, ethoxylated bisphenol A dimethacrylate and hexanediol dimethacrylate and said UV-curable film-forming dimethacrylate of said second fluid deposit is selected form the group consisting of ethoxylated bisphenol A dimethacrylate and hexanediol dimethacrylate or a mixture thereof.

8. The adhesive system of claim 6, wherein said first fluid deposit comprises by weight about 15–74% uncured epoxy resin, about 20–75% of said film-forming material selected from the group consisting of ethoxylated bisphenol A dimethacrylate and hexanediol dimethacrylate and about 1–10% of said photoinitiator.

9. The adhesive system of claim 8, wherein said second fluid deposit comprises by weight about 75–85% of said curing agent, about 14–24% of said film-forming dimethacrylate selected from the group consisting of ethoxylated bisphenol A dimethacrylate and hexanediol dimethacrylate and about 1–5% of said photoinitiator.

10. The adhesive system of claim 6, wherein said first fluid deposit comprises by weight about 15–74% of said epoxy resin, about 20–75% of ethoxylated bisphenol A dimethacrylate film-forming material and about 1–10% of said photoinitiator.

11. The adhesive system of claim 10, wherein said second fluid deposit comprises by weight about 15–74% of said epoxy resin and about 20–75% of said film-forming material selected from the group consisting of ethoxylated bisphenol A dimethacrylate and hexanediol dimethacrylate.

12. The adhesive system of claim 6, wherein said second fluid deposit comprises about 70–77% tridimethylaminomethylphenol, about 3–10% benzyldimethylamine, 19% ethoxylated bisphenol A dimethacrylate and about 1% of said photoinitiator.

13. The adhesive system of claim 6, wherein at least one of said first and second fluid deposits is microencapsulated.

14. The adhesive system of claim 6, wherein said film-forming material of said first fluid deposit and said film-forming dimethacrylate of said second fluid deposit are both ethoxylated bisphenol A dimethacrylate.

15. The adhesive system of claim 6, wherein said film-forming dimethacrylate of said second fluid deposit is a mixture of ethoxylated bisphenol A dimethacrylate and hexanediol dimethacrylate.

16. An adhesive package consisting essentially of:
a first fluid mixture of uncured epoxy resin having throughout a radiation-curable, film-forming compound and a photoinitiator capable, upon exposure to radiation, of curing said film-forming material to form an integral, thin, continuous, dry, substantially pin-hole free, flexible, non-tacky outer protective skin;
a first integral, continuous, dry, non-tacky outer protective skin of selected thickness bounding a surface of said first fluid mixture formed by exposing a portion of said first fluid mixture to radiation;
a second fluid mixture of a curing agent for said uncured epoxy resin having throughout a radiation-curable, film-forming dimethacrylate and a photoinitiator capable, upon exposure to radiation, of curing said film-forming dimethacrylate to form an integral, thin, continuous, dry, substantially pin-hole free, flexible, non-tacky outer protective skin; and
a second integral, continuous, dry, non-tacky outer protective skin of selected thickness bounding a surface of said second fluid mixture formed by exposing a portion of said second fluid mixture to radiation.

17. The adhesive package of claim 16, wherein said film-forming compound of said first fluid mixture is selected from the group consisting of trimethylopropane triacrylate, ethoxylated bisphenol A dimethacrylate and hexanediol dimethacrylate and said film-forming dimethacrylate of said second fluid deposit is selected from the group consisting of ethoxylated bisphenol A dimethacrylate and hexanediol dimethacrylate.

18. The adhesive package of claim 16, wherein said first fluid mixture comprises by weight about 15–74% of said epoxy resin, about 20–75% of said film-forming compound selected from the group consisting of ethoxylated bisphenol A dimethacrylate and hexanediol dimethacrylate and about 1–10% of said photoinitiator.

19. The adhesive package of claim 18, wherein said second fluid mixture comprises by weight about 75–85% of said curing agent, about 14–24% of said film-forming dimethacrylate selected from the group consisting of ethoxylated bisphenol A dimethacrylate and hexanediol dimethacrylate and about 1–5% of said photoinitiator.

20. The adhesive package of claim 16, wherein said first fluid mixture comprises by weight about 15–74% of said epoxy resin, about 20–75% of said film-forming material, said material being ethoxylated bisphenol A dimethacrylate and about 1–10% of said photoinitiator.

21. The adhesive package of claim 20, wherein said second fluid mixture comprises by weight about 15–74% of said epoxy resin, about 20–75% of said film-forming dimethacrylate selected from the group consisting of ethoxylated bisphenol A dimethacrylate and hexanediol dimethacrylate.

22. The adhesive package of claim 16, wherein at least one of said first and second fluid mixtures is microencapsulated.

23. The adhesive system of claim 16, wherein said first fluid mixture comprises about 70–77% tridimethylaminomethylphenol, about 3–10% benzyldimethylamine, 19% ethoxylated bisphenol A dimethacrylate and about 1% of said photoinitiator.

24. The adhesive package of claim 16, wherein said film-forming compound of said first fluid mixture is ethoxylated bisphenol A dimethacrylate and said film-forming dimethacrylate of said second fluid mixture is ethoxylated bisphenol A dimethacrylate.

25. The adhesive package of claim 16, wherein said film-forming dimethacrylate of said second fluid mixture is a mixture of ethoxylated bisphenol A dimethacrylate and hexanediol dimethacrylate.

* * * * *